US012574467B2

(12) United States Patent
Nihas et al.

(10) Patent No.: US 12,574,467 B2
(45) Date of Patent: Mar. 10, 2026

(54) METHODS AND DEVICES FOR CAPTURING AN ITEM IMAGE

(71) Applicant: Shopify Inc., Ottawa (CA)

(72) Inventors: Guduru Sai Nihas, Ottawa (CA); Salim Batlouni, Ottawa (CA)

(73) Assignee: Shopify Inc., Ottawa (CA)

( * ) Notice: Subject to any disclaimer, the term of this patent is extended or adjusted under 35 U.S.C. 154(b) by 579 days.

(21) Appl. No.: 17/009,855

(22) Filed: Sep. 2, 2020

(65) Prior Publication Data

US 2022/0070388 A1 Mar. 3, 2022

(51) Int. Cl.
| | |
|---|---|
| *H04N 5/272* | (2006.01) |
| *G06Q 30/0601* | (2023.01) |
| *G06T 11/60* | (2006.01) |
| *H04N 5/262* | (2006.01) |

(52) U.S. Cl.
CPC ......... *H04N 5/272* (2013.01); *G06Q 30/0601* (2013.01); *G06T 11/60* (2013.01); *H04N 5/2628* (2013.01); *G06T 2210/22* (2013.01)

(58) Field of Classification Search
CPC .......... G06Q 30/0643; G06Q 30/0601; G06Q 10/087; G06Q 30/0623; G06T 11/60; G06T 7/13; G06T 7/194; G06T 2210/22; G06T 3/40; G06T 7/60; H04N 5/272; H04N 5/2628; H04N 5/232933; H04N 7/185; G06V 20/20
See application file for complete search history.

(56) References Cited

U.S. PATENT DOCUMENTS

| | | | | |
|---|---|---|---|---|
| 10,445,915 B1 * | 10/2019 | Jeon | ........................ | G06T 11/60 |
| 10,575,045 B1 * | 2/2020 | Kruse | ................ | H04N 21/4722 |
| 2013/0238463 A1 * | 9/2013 | Nishida | .............. | G06Q 30/0609 |
| | | | | 705/26.35 |
| 2014/0152875 A1 | 6/2014 | Tobin | | |
| 2015/0006333 A1 * | 1/2015 | Silveira | .............. | G06Q 30/0641 |
| | | | | 705/27.1 |
| 2015/0287129 A1 | 10/2015 | Ruan | | |
| 2016/0155162 A1 * | 6/2016 | Gagnon-Volles | .......................... | |
| | | | | G06Q 30/0605 |
| | | | | 705/26.2 |

(Continued)

OTHER PUBLICATIONS

Extended European Search Report dated Oct. 25, 2021; Application No. 21173665.7.

(Continued)

*Primary Examiner* — Jin Cheng Wang

(74) *Attorney, Agent, or Firm* — Rowand LLP

(57) ABSTRACT

Methods and devices for capturing images for use in online retail of product items. A mobile device having a camera may be used when building a product item record having an associated image of the product. The method of capturing a suitable image may include obtaining a product item display page for a product item, the product item display page having a designated portion defined for display of an image of the product item; obtaining a real-time live stream of images from the camera; processing the live stream from the camera to create a processed live stream, and displaying the product item display page with the processed live stream displayed within the designated portion; and storing a processed image for the product item in association with an item record for the product item.

22 Claims, 7 Drawing Sheets

(56)  References Cited

U.S. PATENT DOCUMENTS

| | | | | |
|---|---|---|---|---|
| 2016/0381427 A1* | 12/2016 | Taylor | ................. | H04N 21/472 |
| | | | | 725/13 |
| 2017/0163882 A1* | 6/2017 | Piramuthu | ............ | G06T 1/0007 |
| 2017/0193644 A1 | 7/2017 | Fry | | |
| 2017/0249693 A1* | 8/2017 | Greenwood | ....... | G06Q 30/0601 |
| 2018/0246983 A1* | 8/2018 | Rathod | ................ | G06F 16/972 |
| 2018/0302682 A1* | 10/2018 | Saxena | ............. | H04N 21/4722 |
| 2019/0080172 A1* | 3/2019 | Zheng | ................... | G06Q 30/08 |
| 2019/0141410 A1* | 5/2019 | Zverina | ........... | H04N 21/23418 |
| 2019/0220922 A1* | 7/2019 | Barkas | .................. | G06Q 40/12 |
| 2019/0244436 A1* | 8/2019 | Stansell | .................. | G06T 19/20 |
| 2019/0378144 A1* | 12/2019 | Vinogradov | ....... | G06Q 30/0607 |
| 2019/0378146 A1* | 12/2019 | Vinogradov | ....... | G06Q 30/0185 |
| 2019/0385219 A1* | 12/2019 | Ouyang | ............ | G06Q 30/0641 |
| 2019/0392220 A1 | 12/2019 | Maan et al. | | |
| 2020/0334325 A1* | 10/2020 | Courouble | ............. | G06F 40/14 |
| 2020/0380457 A1* | 12/2020 | Soon-Shiong | ......... | G06Q 30/06 |
| 2021/0042724 A1* | 2/2021 | Rathod | ................... | G07F 9/026 |
| 2021/0042734 A1* | 2/2021 | Malhotra | .......... | G06Q 20/3276 |
| 2021/0174087 A1* | 6/2021 | Srikanth | ............. | G06V 20/647 |
| 2021/0241332 A1* | 8/2021 | Rawson | ............. | G06Q 30/0605 |
| 2021/0386219 A1* | 12/2021 | Koci | ..................... | G06T 1/0007 |
| 2022/0070514 A1* | 3/2022 | Li | ...................... | G06Q 30/0643 |
| 2022/0239988 A1* | 7/2022 | Yang | ................... | G06V 10/764 |
| 2022/0292587 A1* | 9/2022 | Wang | ................... | G06F 40/253 |
| 2022/0405341 A1* | 12/2022 | Xiao | ................. | G06Q 30/0643 |

OTHER PUBLICATIONS

CA Office Action dated Jan. 13, 2026; CA Application No. 3,121,056.

Levring, H. et al., "Intelligent and Real-Time Video Background Removal on Intel(R) Graphics Tehnology Using XSplit Vcam", intel.com, https://www.intel.com/content/www/us/en/developer/articles/technical/intelligent-and-real-time-video-background-revoval-on-intel-graphics-technology-using-xsplit-vcam.html (retrieved Jan. 4, 2026), Feb. 27, 2019.

Remove.bg team, "Remove Video Backgrounds 100% Automatically with Unscreen", remove.bg, https://www.revove.bg/b/remove-video-backgrounds-100-automatically-with-unscreen (retrieved Jan. 4, 2026), Mar. 7, 2020.

* cited by examiner

702
Obtain an item display page

704
Initiate a camera function to obtain live stream camera feed

706
Process live stream to product processed real-time live stream camera feed

708
Display item display page with processed real-time live stream camera feed displayed in designated portion for item image 710
Capture image 712
Store image in association with item record

METHODS AND DEVICES FOR CAPTURING AN ITEM IMAGE

FIELD

The present disclosure relates to capturing images of items and, in particular, capturing item images for insertion into item display pages.

BACKGROUND

Physical item inventory systems typically have an inventory item record for each type of physical item. An inventory item record may contain details regarding the physical item, including its name or label and other details regarding the item. There may be an image or images of the physical item stored in the inventory item record or in association with the inventory item record. In some cases, the inventory may be browsed through an online portal or website using a browser, app, or other software to access and view items. An item display page may pull data from one of the item records, including the image, and render it in the item display page for viewing on a computing device. Example applications of such systems include online shopping, a museum, an art gallery, a library, a warehouse, etc. In the case of online retail, a prospective consumer may browse product item display pages which include an image or images of the product items.

The building of an online inventory of item records reflecting the full catalog of available items is an onerous task. Moreover, few retailers, particularly small retailers attempting to transition to online sales from brick-and-mortar retail, have the expertise or equipment for professional product photography. Often the device used for item record creation and the device used for product item imaging may be different devices. It can be time-consuming, wasteful of computing resources, and frustrating for users to capture an image of an item, attempt editing of the image, upload the image for use in developing an item display page only to find the image is unsuitable, and then reattempt to capture a suitable image, iteratively.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

Figure 1:
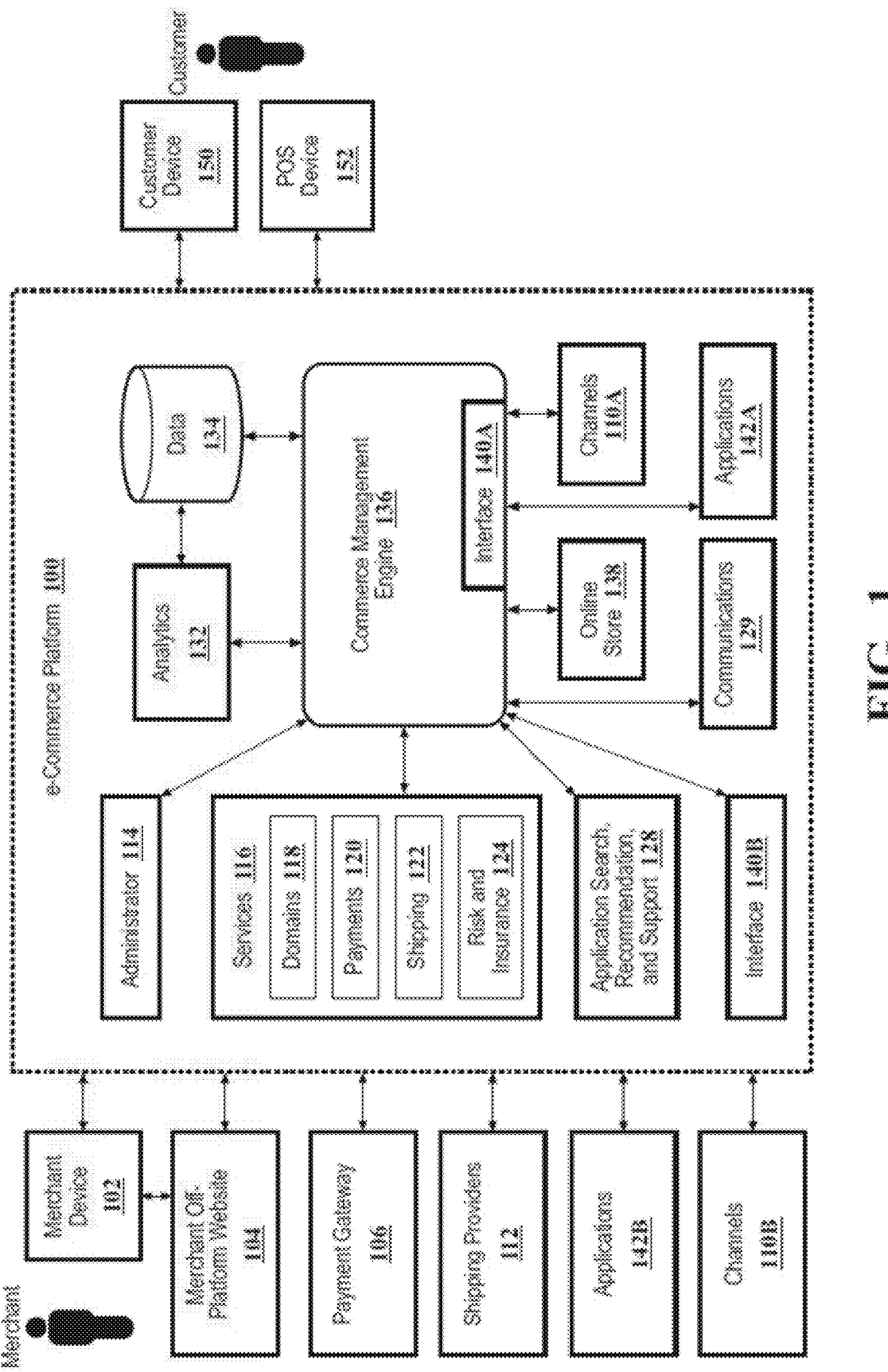
FIG. 1 is a block diagram of an example e-commerce platform, according to one embodiment.

In one aspect, the present application describes a computer-implemented method for capturing product images for online retail using a mobile device having a camera. The method may include obtaining a product item display page for a product item, the product item display page having a designated portion defined for display of an image of the product item; obtaining a real-time live stream of images from the camera; processing the live stream from the camera to create a processed live stream; displaying the product item display page with the processed live stream displayed within the designated portion; and storing a processed image for the product item in association with an item record for the product item.

In some implementations, processing may further include detecting the product item in the live stream and, in some cases, processing of the live stream is based on the detected product item and includes cropping the live stream. Cropping may be based on the geometry of the designated portion. In some cases, the processing of the live stream is based on the detected product item and includes scaling the live stream. Scaling may be based on edges of the detected item and a minimum portion of a vertical dimension of the designated portion or of a horizontal dimension of the designated portion. In some cases, processing may include altering a portion of images in the live stream adjacent to the detected product item. Altering may include blurring or filling the portion of the images in the live stream adjacent to the detected product item.

In some implementations, storing may further include detecting a capture image instruction and, in response to the capture image instruction, selecting a current frame of the processed live stream as the processed image.

In some implementations, storing may further include detecting a capture image instruction and, in response to the capture image instruction, capturing a new static image using the camera, and processing the image to obtain the processed image.

In another aspect, the present application describes a mobile computing device to capture product images for online retail. The device may include one or more processors; a display coupled to the one or more processors; an image sensor to capture and provide one or more images to the one or more processors; and a processor-readable storage medium containing processor-executable instruction. When executed by the one or more processors, the instruction may cause the one or more processors to obtain a product item display page for a product item, the product item display page having a designated portion defined for display of an image of the product item; obtain a real-time live stream of images from the image sensor; process a live stream from the image sensor to create a processed live stream; output, on the display, the product item display page with the processed live stream displayed within the designated portion; and store a processed image for the product item in association with an item record for the product item.

In yet a further aspect, the present application describes a non-transitory computer-readable medium storing processor-executable instructions for capturing product images for online retail using a mobile device having a camera, wherein the instructions, when executed by one or more processors, are to cause the one or more processors to carry out one or more of the processed described herein.

For illustrative purposes, specific example embodiments will now be explained in greater detail below in conjunction with the figures.

Item inventory systems typically have an inventory item record for each type of physical item. An inventory item record may contain details regarding the physical item, including its name or label and other details regarding the item. There may be an image or images of the physical item stored in the inventory item record or in association with the inventory item record. In some cases, the inventory may be browsed through an online portal or website using a browser, app, or other software to access and view items. An item display page may pull data from one of the item records, including the image, and render it in the item display page for viewing on a computing device. Example applications of such systems include online shopping, a museum, an art gallery, a library, a warehouse, etc. In the case of online retail, a prospective consumer may browse product item display pages which include an image or images of the product items.

The building of an online inventory of item records reflecting the full catalog of available items is an onerous task. Moreover, few retailers, particularly small retailers attempting to transition to online sales from brick-and-mortar retail, have the expertise or equipment for professional product photography. Often the device used for item record creation and the device used for product item imaging may be different devices. It can be time-consuming, wasteful of computing resources, and frustrating for users to capture an image of an item, attempt editing of the image, upload the image for use in developing an item display page only to find the image is unsuitable, and then reattempt to capture a suitable image, iteratively.

Many small retailers may use a multi-tenant e-commerce platform to ease the transition to online commerce rather than building a custom platform, however this may still require the retailer to build an inventory of product item records reflecting their full inventory of available items. The present application is not limited to multi-tenant e-commerce platforms and may be applicable in case of a single merchant ecommerce platform, and may further be applicable outside of ecommerce in any situation in which an inventory system with item records has associated item images in an item display page. Nevertheless, the e-commerce platform is an illustrative example context that will be used to illustrate some possible implementations with respect to the present application. Accordingly, example operation and implementation of an e-commerce platform will be described below.

Example e-Commerce Platform

In some embodiments, the methods disclosed herein may be performed on or in association with an e-commerce platform. Therefore, an example of an e-commerce platform will be described.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
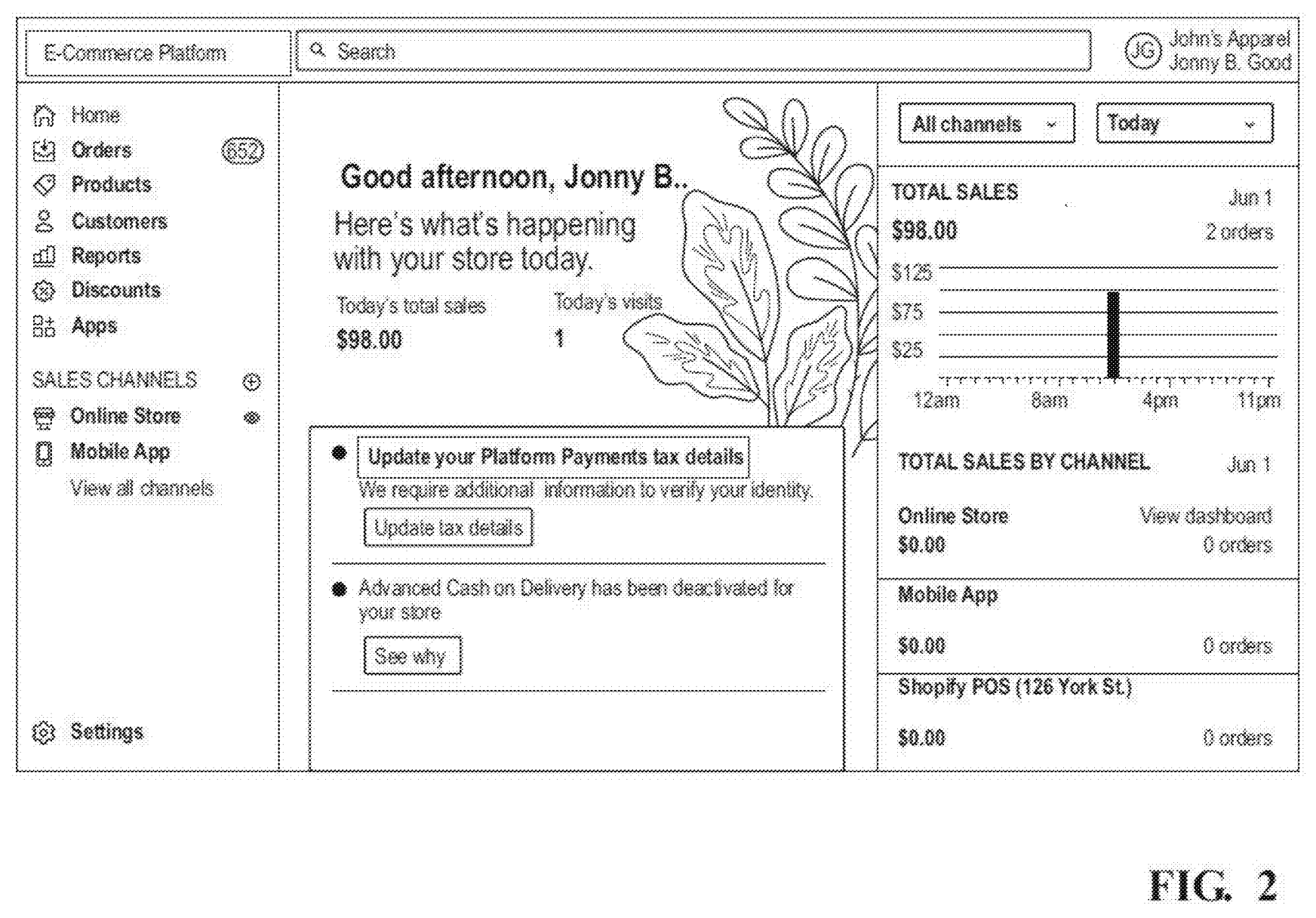

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or noncritical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the lifespan of a cart may be in the order of minutes, carts may be persisted to an ephemeral data store in some cases. However, in many implementations, while the customer session may only last minutes, the merchant and/or customer may wish to have the possibility of returning to a cart built in a previous session. Accordingly, the cart, e.g. the shopping cart data structure populated with product item data and a user identifier, may be stored in persistent memory on the platform 100.

In a typical session, a customer proceeds to checkout at some point after adding one or more items to their shopping cart. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer does not complete the transaction, the e-commerce platform 100 may retain the shopping cart data structure in memory so that the customer may return to the partially-completed cart in a subsequent session (e.g., in an abandoned cart feature).

Checkouts may calculate taxes and shipping costs based on the customer's shipping address. Checkout may delegate the calculation of taxes to a tax component and the calculation of shipping costs to a delivery component. A pricing component may enable merchants to create discount codes. Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Image Capture for Product Display Pages

As noted above, in a variety of contexts, including e-commerce platforms, an administrator or other inventory management user may need to build a set of records reflecting physical items. These may reflect items currently in inventory or that are part of the potential inventory, e.g. physical items that may be inventory now or in the near future, such as current product offerings from a retailer, some of which are in stock and some of which may be temporarily out of stock. In some cases, a built set of records needs to be regularly modified to remove items no longer part of the inventory of physical items or to add new items. For each item, the system includes an item record containing details regarding the item and having at least one associated image.

The system further provides an interface to enable queries for one or more item records and to view the details of those items and their associated images. The interface may be a distinct interface for each item, or, in many cases, is a general interface that is populated with details from the item record, including the associated image or images, when viewing a specific item. For example, the system may provide an item display page (e.g. a webpage, app interface, or the like) having a structure and layout defined by the software instructions implementing the item display page, which may be in HTML, Ruby, PHP, Cascading Style Sheets, Javascript, Swift, Python, or any other suitable language. The item display page may implement a selected "theme", which may define the look-and-feel of the item display page, including its colour palette, layout, fonts, imagery, and other graphical and/or visual features. The item display page is populated with details from a specific item record, including the associated image(s), when browsing that item. A client device may receive the item display page populated with the images and details from the specific item record.

To build or modify the item records, an operator generates new or modified item records on a client device. This may include obtaining and associating one or more item images with the item record.

Figure 3:
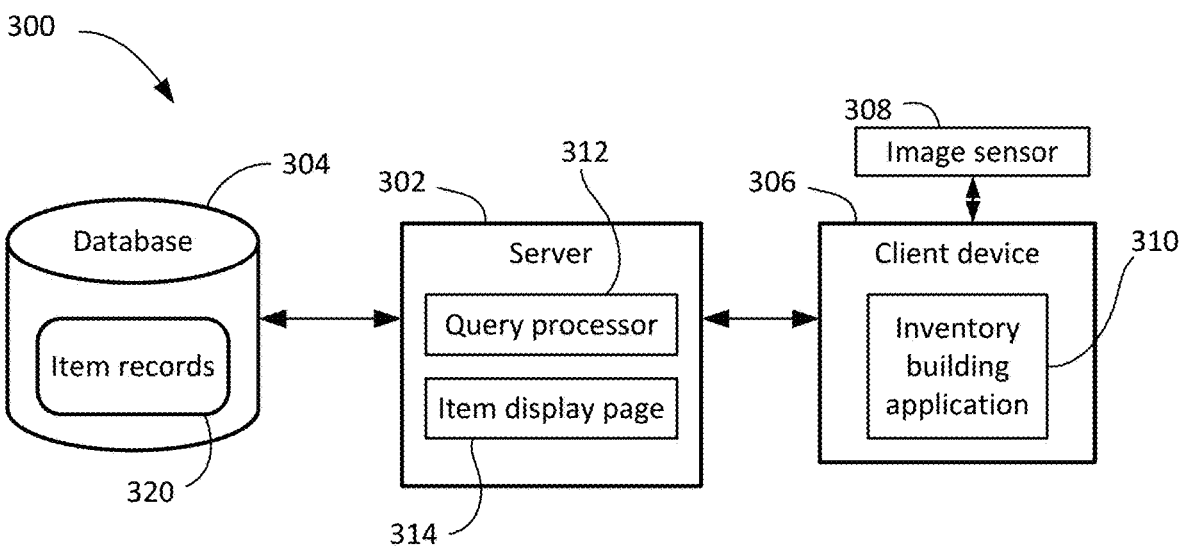
FIG. 3 shows, in block diagram form, one example of an inventory management system.

In accordance with one aspect of the present application, an inventory management system facilitates improved image capture for building of item records. FIG. 3 shows, in block diagram form, one example of an inventory management system 300. In this example, the inventory management system 300 may include a server 302 coupled to a computer-readable storage media, such as a database 304. The database 304 may be implemented within the same computing device(s) as the server 302 or on a separate computing device(s). The inventory management system 300 may include a client device 306. The client device 306 may be coupled to, or may incorporate, an image sensor 308. The image sensor 308 may be a camera in some implementations.

The client device 306 is a computing device and may, in some implementations, include a mobile device, such as a smartphone, tablet, laptop, or the like. The computing device includes one or more processors, memory, communications subsystems, input and output devices, at least one display, and a power source. The memory may store software, including an operating system and applications software. The applications software may include an inventory building application 310 configured to, when executed by the one or more processors, cause the computing device to obtain one or more images from the image sensor 308 and build one or more product item records. The process carried out by the computing device may reflect operations detailed in one or more of the methods described below.

The client device 306 and the server 302 communicate over one or more wired and/or wireless networks, which may include private networks, the Internet, various WLANs, WWANs, or the like.

The server 302 may be implemented using one or more computing devices having one or more processors and suitable software, such as operating system software and other processor-executable software. In some cases, the server 302 may include database software for implementing and managing the database 304, including creating and storing records in the database, removing or deleting records from the database, and executing queries to identify and read records from the database. In this respect, the server 302 may include a query processor 312 configured to receive one or more queries from remote devices, such as the client device 306, and to carry out query operations to identify records in the database corresponding to the query and to return query results. The query processor 312 may be implemented as part of database management software or, in some cases, may be a standalone application. The database 304 may be made up of a large plurality of item records 320.

In this example, the server 302 may further include an item display page 314. In some implementations, the server 302 may, in part, function as a web server and may include a number of web pages, including an item display page 314. Mobile and desktop versions of the item display page 314 may be stored on the server 302. The server 302 may be configured to transmit the item display page to the client device 306 in response to a browser request from the client device 306. In some cases, the browser request from the client device includes identification of an item record, in which case the server 302 obtains the corresponding item record 320 from the database 304 and inserts details and image(s) from the item record 320 into the item display page 314 before transmitting the item display page 314 to the client device 306.

In another example embodiment, the item display page 314 is incorporated into an inventory application (not shown) on a client mobile device and, when that client mobile device browses the inventory of items, the inventory application connects to the server 302 to obtain item records 320 based on the search criteria and renders the item display page 314 defined by the inventory application on the client mobile device incorporating the details from the retrieved item records 320, including any associated images, based on the layout and structure of the item display page defined in the inventory application.

In an inventory building mode, the client device 306 may, using the inventory building application 310, create one or more new or modified item records, capture item images using the image sensor 308, and transmit those item records and associated images to the server 302 for storage in the database 304.

As will be described further below, the inventory building application 310 may be configured to obtain the item display page 314 from the server (or from the inventory application on the client device 306, if available) so as to facilitate image preview and image capture in accordance with one or more of the methods described below. In some examples, the inventory building application 310 causes the client device 306 to pre-process a live stream of camera images to create a processed stream that is displayed by the client device in a designated image portion of the item display page. This provides a displayed preview of the item display page with a real-time capture preview of the image in the layout and context of the page with pre-processing applied to enable an accurate preview and assessment of the likely image. The item display page includes a colour palette, fonts, images, background graphics and other graphical or visual features prescribed by its theme, meaning the displayed real-time capture preview of the image appears within the full context of the visuals of the item display page. A captured image may be obtained from a frame of the live feed or may be captured as a static image. The capture event may be triggered by receipt of an input instruction, e.g. a button press or screen tap, for example, or automatically based on image analysis by the client device 306.

Figure 4:
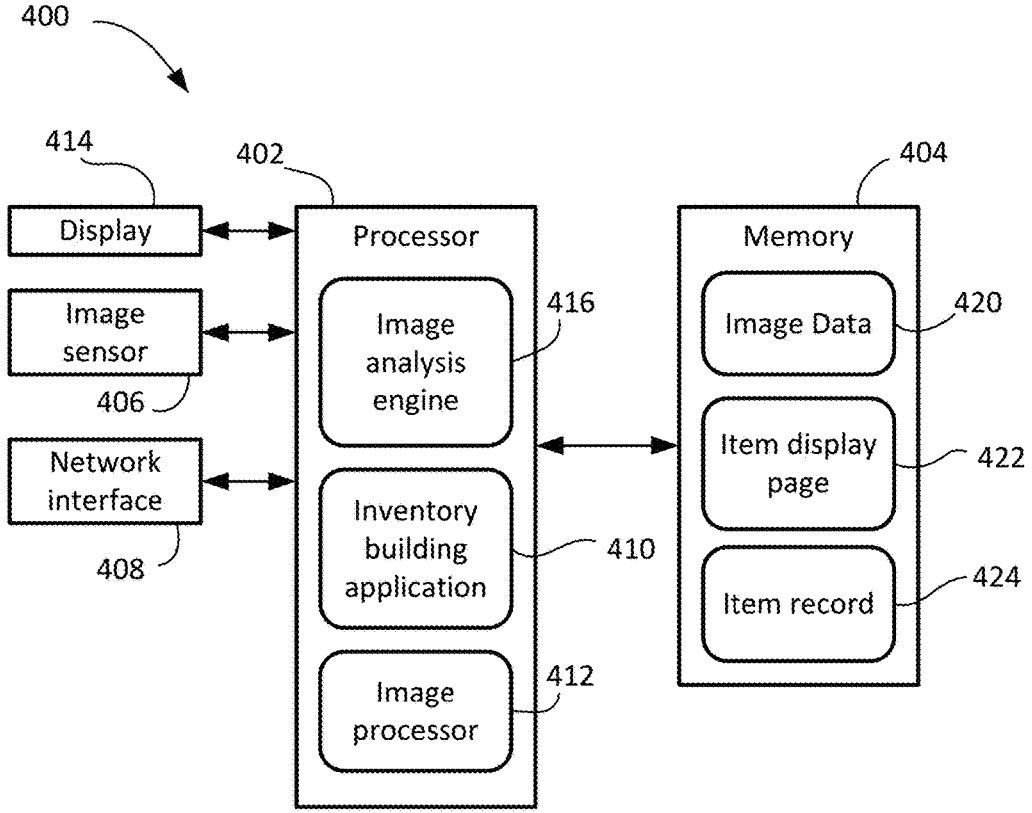
FIG. 4 shows, in block diagram form, one simplified example of a client device in an inventory management system.

FIG. 4 shows, in block diagram form, one simplified example of a client device 400. The client device 400 may be a mobile computing device in some embodiments, such as a smart phone, laptop, tablet, or the like. The client device 400 includes a processor 402 and memory 404. It may further include a network interface 408. The network interface 408 may be wired or wireless and may enable the client device 400 to communicate with remote devices over one or more computer networks, using technologies such as WLAN communications (e.g. IEEE 802.11 "WiFi"), 3G/4G/5G WWAN communications, short-range communications (Bluetooth™), or other such technologies and/or protocols.

The client device 400 includes an image sensor 406, which in some implementations may include one or more camera devices, such as CMOS image sensors, for capturing image data. The camera may operate under control of camera software executed by the processor 402 to control operation of the camera. In some cases, the camera may capture a still image, which the processor 402 may analyze and/or store in the memory 404. In some cases, the camera may capture video images, which the processor 402 may analyze and/or store in the memory 404. In some cases, the camera software may enable operation of the camera in a "viewfinder" or "live preview" mode, in which a real-time live stream of image data is available to the processor 402 for analysis and/or for display on a display 414. In some cases, the image sensor 406 may include more than one camera. In some cases, the image sensor 406 may include light sensors outside the visible light spectrum. In some cases, the image sensor 406 includes a LiDAR sensor.

The client device 400 may include processor-executable software for implementing and controlling device functions and operations. Operating system software may implement basic device functions and applications software may implement more specific functionality. Among the applications software, the client device 400 may include an inventory building application 410 and an image processor 412. In some cases, the applications software further includes an image analysis engine 416. In some cases, the image processor 412 and/or the image analysis engine 416 are implemented as part of the inventory building application 410. In some cases, the image analysis engine 416 is a part of the image processor 412.

Image data 420 captured by the image sensor 406 may be stored in the memory 404.

In operation, the client device 400 enables building of inventory records for a plurality of physical items. The client device 400 obtains an image using the image sensor 406. An image processor 412 may apply image processing to the image to create a processed image. The image processing may include cropping, zooming, or changing aspect ratio. The image processing may include image content changes such as adjusting brightness, hue, saturation, white balance, or other settings. The image processing may include background blurring, removal, or colouring, in some cases.

The image analysis engine 416 identifies a physical item in the image. The physical item may be identified by the image analysis engine 416 using feature detection and/or extraction. In some cases the image analysis engine 416 may use a scale-invariant feature transform (SIFT) algorithm or another feature detection algorithm to identify a physical item in the image. The identification of the physical item may be guided by pre-selected categories of item types. For instance, in the case of a grocery retailer, the algorithm may be configured to detect features that tend to correspond to the shapes of typical grocery items. In one example, the algorithm may be trained in particular to recognize boxes, bottles, container shapes, bags, and other typical packaging shapes. In a further example, the algorithm may be trained to detect and recognize text matter, labels, price stickers, barcodes, graphic images, or other common visual features associated with retail packaging.

The item detection performed by the image analysis engine 416 may be used by the image processor 412 in processing the image. For example, the feature detection may be used to determine boundaries for cropping the image in order to contain only the detected physical item. In another example, the feature detection may be used to detect edges of the physical item so as to distinguish between the item and the background, which may be used in removing background portions of the image or transforming them to white space.

Although the above description indicates that the all image analysis, feature detection, and image processing is carried out by the client device 400, in some cases a remote server, such as the server 302 (FIG. 3) may be configured to perform some portion or all of these operations.

The inventory building application 410 facilitates the building or amending of an item record 424, and in particular the obtaining of suitable image data 420. The item record 424 may be newly-created by the client device 400, or may be an existing item record that was created earlier and has been obtained by the client device 400 from a remote location, like server 304/database 304 (FIG. 3).

The inventory building application 410 facilitates the obtaining of suitable image data 420 in part by displaying on the display 414 an item display page 422. The item display page 422 may be a webpage, app GUI, or other user interface having a defined layout that includes at least a portion of the page designated for display of an item image. The item display page 422 may pre-exist locally on the client device 400, such as if it is part of an item inventory viewing application (not shown), or may obtained from a remote location, such as the server 302. Data from the item record 424 is inserted into the item display page 422 in accordance with its defined layout and graphical elements. If there is an existing image associated with or contained in the item record 424, then the inventory building application 410 causes the image to be displayed in the defined portion of the item display page 422 designated for item imagery.

When the inventory building application 410 is in an item record edit mode and, in particular, an image capture mode, then inventory building application 410 instructs the processor 402 to obtain the live stream camera data from the image sensor 406. The image processor 412 processes the live stream, and a processed live stream is displayed in the designated portion of the displayed item display page 422. This provides an operator with a live real-time display of prospective item imagery in the context of the item display page 422. Moreover, because the real-time live view camera feed from the image sensor 406 is processed by the image processor 412, the display may accurately reflect the prospective item image in terms of its cropping, any zoom/scaling, aspect ratio changes, image parameter adjustments (e.g. brightness, hue, saturation, white balance, etc.), or background removal, blurring or whiteout.

While in the image capture mode, during which the item display page 422 is displayed with the real-time live view processed camera feed shown within the item display page 422, the inventory building application 410 may capture and store image data 420 representing one or more images for association with the item record 424. In some implementations, the image capture is triggered by receipt of an image capture input. The image capture input may include a button press, a screen input (tap, double-tap, swipe, or other gesture), voice command, or another user input. The image capture may include capturing a new image using the image sensor 406 and then processing and storing that image as the image data 420. The captured and processed image may then be displayed within the item display page 422 on the display 414, to enable operator review and evaluation as a static image of the item. Further image edit options may be provided for altering the static image. In some cases, the image capture may include selecting and storing a current image, e.g. a frame, from the processed real-time live view being then displayed. In other words, selecting a current image from the processed live view as the static image. That static image is then displayed within the item display page 422 to enable review and, at the option of the operator, saving or discarding of the static image. The inventory building application 410 may provide the option of returning to the real-time live view camera feed to enable the operator to adjust the client device 400 position or other factors influencing the image quality, such as camera settings and/or ambient lighting or background conditions, and to capture a new image.

In some cases, the image analysis engine 416 may further be used to extract data from the live feed and/or the static image to add details to the item record 424. The extracted data may be obtained using, for example, feature detection, text recognition, and/or remote database image searches.

In some cases, as will be further described below, the inventory building application 410, in conjunction with or using the image processor 412 and/or image analysis engine 416, may evaluate images from the real-time live view camera feed from the image sensor 406 against a set of criteria. For example, based on feature detection and identification of the item in the image, the criteria may include determining a proportion of the image containing the item (e.g. whether it occupies at least a threshold portion of the image; otherwise, it may be too small/far away), or determining a centeredness of the image (e.g. whether its edges/boundaries are all visible and detectable within the image boundaries, or whether its approximate centerpoint is within a threshold distance of the center of the image). In another example, again using feature detection, determining whether the edges/boundaries of the item are detectable such that areas outside the item may be classed as background, which may be more difficult if the background is too busy or too close in colour and/or pattern to the item. In another example, the criteria may include a minimum and/or maximum brightness or other such image quality parameters.

In one embodiment, based on feature detection and/or item selection input from a user if more than one item is detected, the inventory building application 410 may overlay a bounding box or other guidance indicia to illustrate how to position the item in the camera frame. In some cases, the aspect ratio of the bounding box or indicia may be based on the shape of the detected item; that is, a generally square or circular item may result in display of a square bounding box, whereas detection of a generally rectangular item may result in display of a rectangular bounding box having the relative long and short dimensions that proportionally match the relative dimension of the generally rectangular item. The bounding box or indicia may assist the user in positioning the camera such that the item is centered and is at the appropriate scale within the eventual image. In some cases, once the item is detected as being, within a threshold error, positioned within the bounding box and at the appropriate scale then the inventory building application 410 may trigger automatic capture of an image.

Having evaluated the real-time live feed against criteria, the inventory building application 410 may provide output feedback regarding criteria that are unmet by the images in the real-time live feed, processed or unprocessed. The feedback may include suggested changes, such as "the item is too far away/small", "the item is off-center", "the item is tilted", "the lighting is too bright", "the lighting is too dim", "the background is too busy", etc. The feedback may be output on the display 414 as text (e.g. in a popup notification on the item display page) or as a voice feedback via a speaker. In some cases, graphical guidance may be rendered atop the displayed real-time live feed. Graphical guidance may include text suggestions and/or guidance lines indicating the scale and/or center and/or corner positions for aligning the item in the frame, such as the bounding box or other indicia for aiding in centering/scaling. In some implementations, the text or graphical guidance may be combined with the bounding box and/or guidelines. In some cases, the identified item is highlighted or indicate by crosshairs or other indicia at the corners of its detected shape (typically rectangular or square, although may be other shapes in some cases). Text guidance may prompt a user to align the crosshairs of the detected item with the bounding box and/or guidelines to center the item in the image at the appropriate scale.

Accordingly, the client device 400 and, in particular, the inventory building application 410, may facilitate more efficient and effective capture of usable item images for an inventory management system that displays item information from item records with associated item images, when creating the item records on a client device 400.

Figure 5:
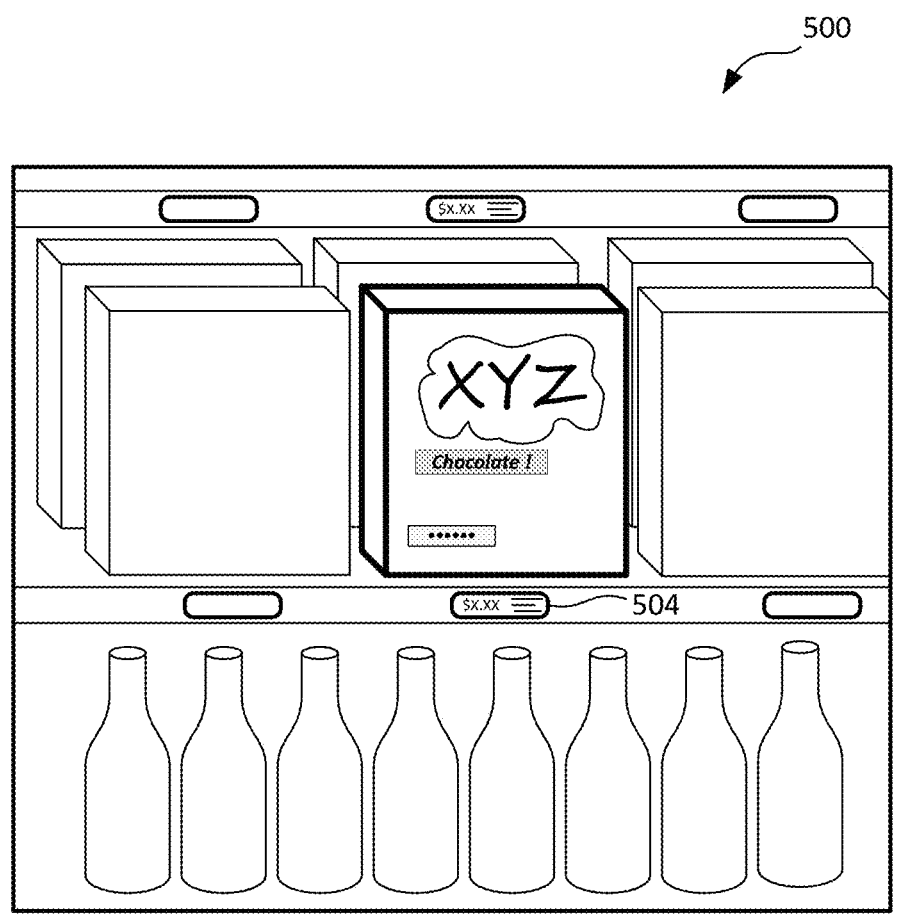
FIG. 5 shows an example image of a retail shelf displaying physical items.

To further illustrate by way of example, reference is now made to FIG. 5 which diagrammatically shows an example image 500 of a retail shelf displaying physical items. The image 500 may be a current frame of a real-time live stream from an image sensor of a client device. The image 500 may be displayed on the display of the client device as part of displaying the live stream within the designated portion of an item display page.

The inventory building application, whether using the client device, the server, or both, may analyze the image 500 to identify features and detect a physical item. In some cases, the system may detect multiple physical items. If multiple items are detected, the system may prompt an operator to select one of the items, for example by tapping or otherwise providing a user input selecting one of the identified items.

In this example, the system detects a first physical item, identified using heavier line weight in the image 500. The system tracks the identified item in successive frames/images of the live stream. In some implementations, the client device may display an indicator signalling detection of a physical item in images of the live stream. In some implementations, the client device may be configured to output a visual and/or auditory indication of a detected physical item. In one example, the client device may be configured to graphically indicate the detected physical item by colouring, adding an outline, highlighting, or otherwise visually identifying the detected physical item in the live stream of images displayed. In this example, the heavier line weight shown may be applied by the client device as an overlay to the live stream of images, perhaps in a notable colour, such as bright red or green.

In some cases, upon detecting the physical item, the system may extract item data from the image. Extracted item data may include a brand, a logo, a sub-brand, other text data, size information, price information, a barcode, QR code or other such item identifying data. The system may employ text recognition and other image analysis techniques in analyzing the content of the portion of the image containing the physical item. In some cases, the system may further analyze and extract data from an area near the physical item, such as a shelf label 504.

The client device processes the live stream of images from the image sensor using an image processor. The processing may include, for example, cropping the images, scaling the images, removing background adjacent the detected item, and/or altering image parameters.

Figure 6:
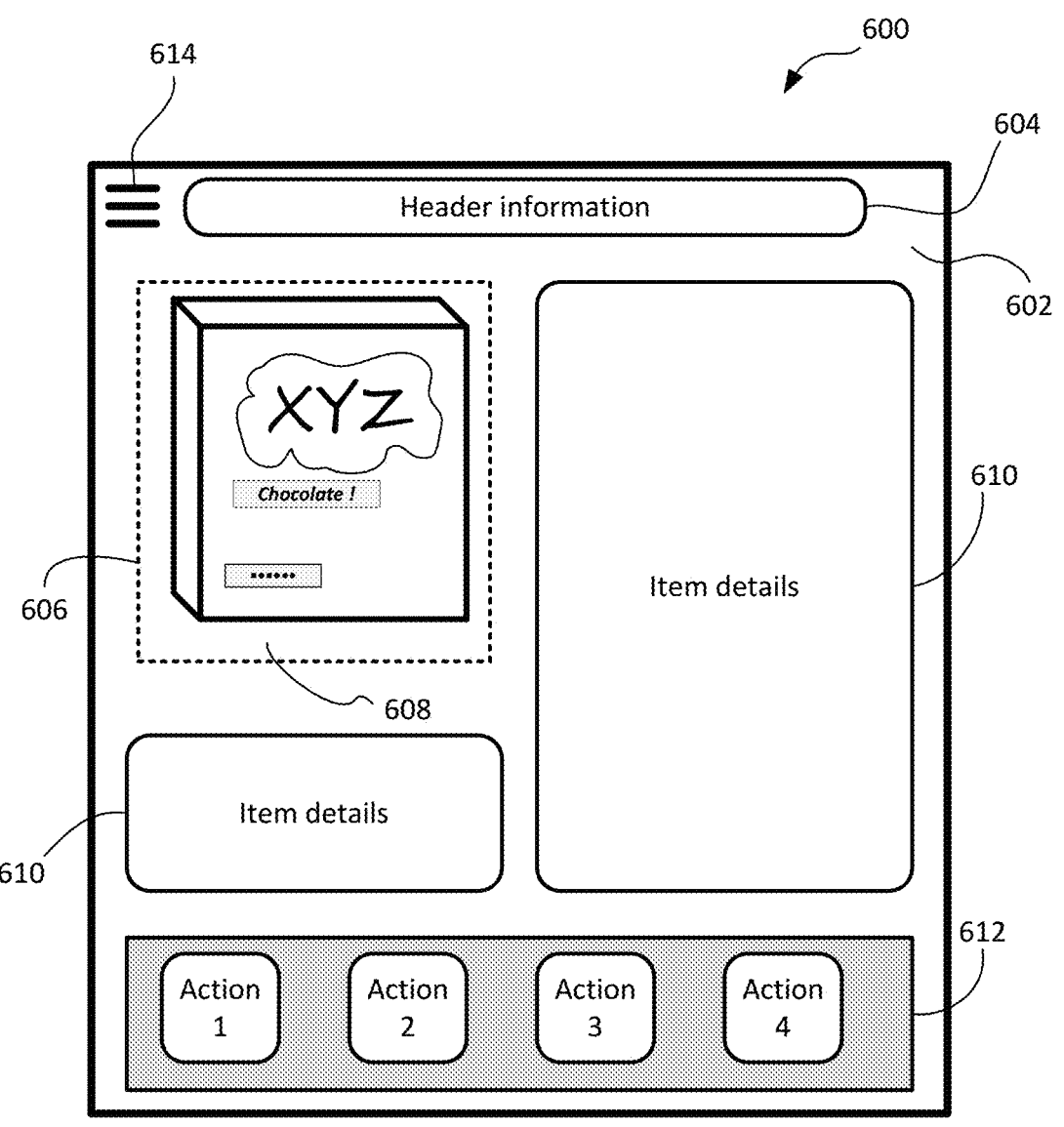
FIG. 6 shows an illustrative example of a client device display showing an item display page.

FIG. 6 shows one example of a client device display 600 showing display of an item display page 602. The item display page 602 may be rendered on the display 600 by an inventory building application executing on the client device. The item display page 602 may have a defined layout for reviewing item details, part of which may include header information 604, a designated portion 606 assigned for display of an item image, and one or more item detail areas 610. The header information 604 may include, for example, the item name or category, or an indication of the current operating mode (e.g. edit mode, image capture mode, etc.) of the inventory building application. The item detail areas

610 may be populated with information from the item record, to the extent such information is available in the item record.

The item display page 602 may reflect the layout and graphics for reviewing inventory item records using the inventory management system. In the case of a retail example, the item display page may be a webpage or app interface for reviewing the details of an available item in the context of an e-commerce application or website.

The designated portion 606 displays the processed real-time live stream from a camera on the client device. The real-time live stream from the camera is processed by an image processor to obtain the processed real-time live stream. The processing may include removing or whiting-out a background portion 608 of the image adjacent to or surrounding a detected physical item. The processing may include cropping and/or zooming the real-time live stream based on the detected physical item, in accordance with an aspect ratio defined by the geometry of the designated portion 606. Processing may further or alternately include adjusting image parameters, such as brightness and other metrics.

The item display page 602 may further include a menu icon 614 that, when selected, provides a pull down, pop-up, or other type of menu to enable selection of different editing options with regard to the item display page 602.

The item display page 602 may further include an action menu 612 indicating actions that may be taken with regard to the item display page 602. Illustrative example actions may include "save & exit", "save", "edit details", "discard image", etc.

By displaying the processed real-time live stream in the designated portion 606 of the display, the operator is able to assess the image quality and suitability in the context of the item display page 602 and make any desirable adjustments in camera positioning, background content, or other factors to improve image outcomes. Moreover, guidance prompts and other feedback output may be more meaningful when reviewing a processed real-time live stream in the context of the item display page 602 rather than an unprocessed full-scale live stream outside the context of the page, since the impact on the image suitability will be more readily apparent.

Figure 7:
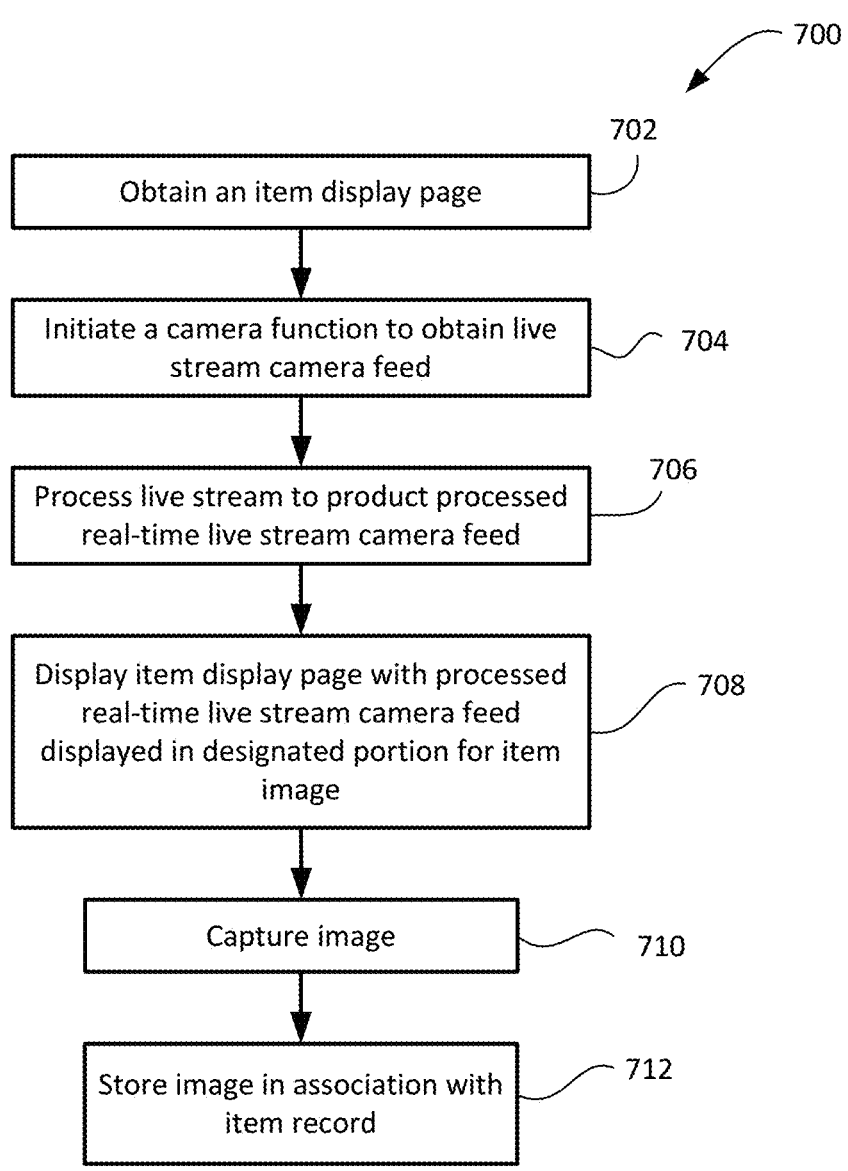
FIG. 7 shows, in flowchart form, one example method for capturing an item image.

Reference will now be made to FIG. 7, which shows, in flowchart form, one example method 700 for capturing an item image. The method 700 may be implemented by a computing device having suitable computer-executable instructions for causing the computing device to carry out the described operations. The instructions may be implemented by way of an inventory building application executing on a computing device. The method 700 may be implemented, in whole or in part, by a mobile computing device, such as the client device 400 (FIG. 4). In some implementations, the client device 400 (FIG. 4) may off-load some operations of the method 700 to an external device, like the server 302 (FIG. 3).

The method 700 includes obtaining an item display page in operation 702. As noted above, the item display page may prescribe a layout for item details and may include at least a portion designated for display of an item image. The item display page may be obtained from local memory or from a remote server.

In operation 704, a camera function is initiated to obtain real-time live stream images from the camera of the client device. The real-time live stream provides a stream of images from the camera, which may be referred to as a live mode, preview mode, or viewfinder mode. The live stream of images is processed in operation 706. The processing may be implemented using an image processor. In some cases, the processing includes feature detection for identifying and/or tracking a physical item in the image. The feature detection may include detecting more than one item and obtaining user input selecting one of the identified items as the item-of-interest and tracking the item-of-interest in subsequent images in the stream.

The processing of the live stream produces a processed live stream. The processing may include, for example, cropping the images to obtain a cropped live stream and/or scaling the images to obtain a scaled live stream. The cropping may be applied in accordance with an aspect ratio defined by the geometry of the designated portion of the item display page. The cropping and/or scaling may be applied so as to center the detected item within the processed live stream and to ensure the detected item spans at least a minimum portion of the vertical or horizontal dimension of the processed live stream.

The processing may include, for example, altering a portion of the image adjacent to the detected item, e.g. a background portion of the image. The altering of the background may include blurring the background or filling the background with a uniform colour value. The uniform colour value may match a background colour value set within the item display page in some implementations.

The processing may include, for example, altering image parameters within the images of the live stream. Image parameters may include, for instance, brightness, hue, saturation, white balance, or other such parameters. The alteration may be based on a determination that the image or images of the live stream have an image parameter that is higher than a maximum value or lower than a minimum value. The alteration may set the image parameter to the maximum value or the minimum value.

In operation 708, the item display page is output to a display on the client device. The output of the item display page further includes displaying the real-time processed live stream within the designated portion of the item display page.

In operation 710, the client device captures an image using the camera. The image may be captured in response to receipt of a user input indicative of a capture command. The user input may be a button press, touchscreen gesture, voice command, or other such inputs. The captured image may be an image (e.g. frame) of the processed live stream. In another implementation, the captured image is a new image captured using the camera based on the user input command, which is then processed in the same manner as the processing of operation 706. In some implementations, the processing of the captured image includes the same processing operations used on the live stream in operation 706 and includes one or more additional processing operations.

In some implementations, in response to the user input of the capture command, the client device presents two or more images as options among which the user may select. The two or more images may be different frames from the processed live stream, in some examples. In some instances, the user may select more than one of the available frames for storage as multiple images.

In another implementation, the client device automatically determines when to capture and store the image based on the live stream image parameters meeting some set of criteria. Example criteria include having a detected physical item, the detected physical item having edges within a threshold distance from the boundaries of the designated area, the image parameters meeting minimum requirements, or other such criteria.

In some implementations, the captured image may be based on processing two or more frames from the processed live stream.

The captured image is then stored in association with the item record in operation 712.

It will be understood that some of the operations of the example method 700 may be performed in a different order or simultaneously without materially impacting operation of the method 700.

Figure 8:
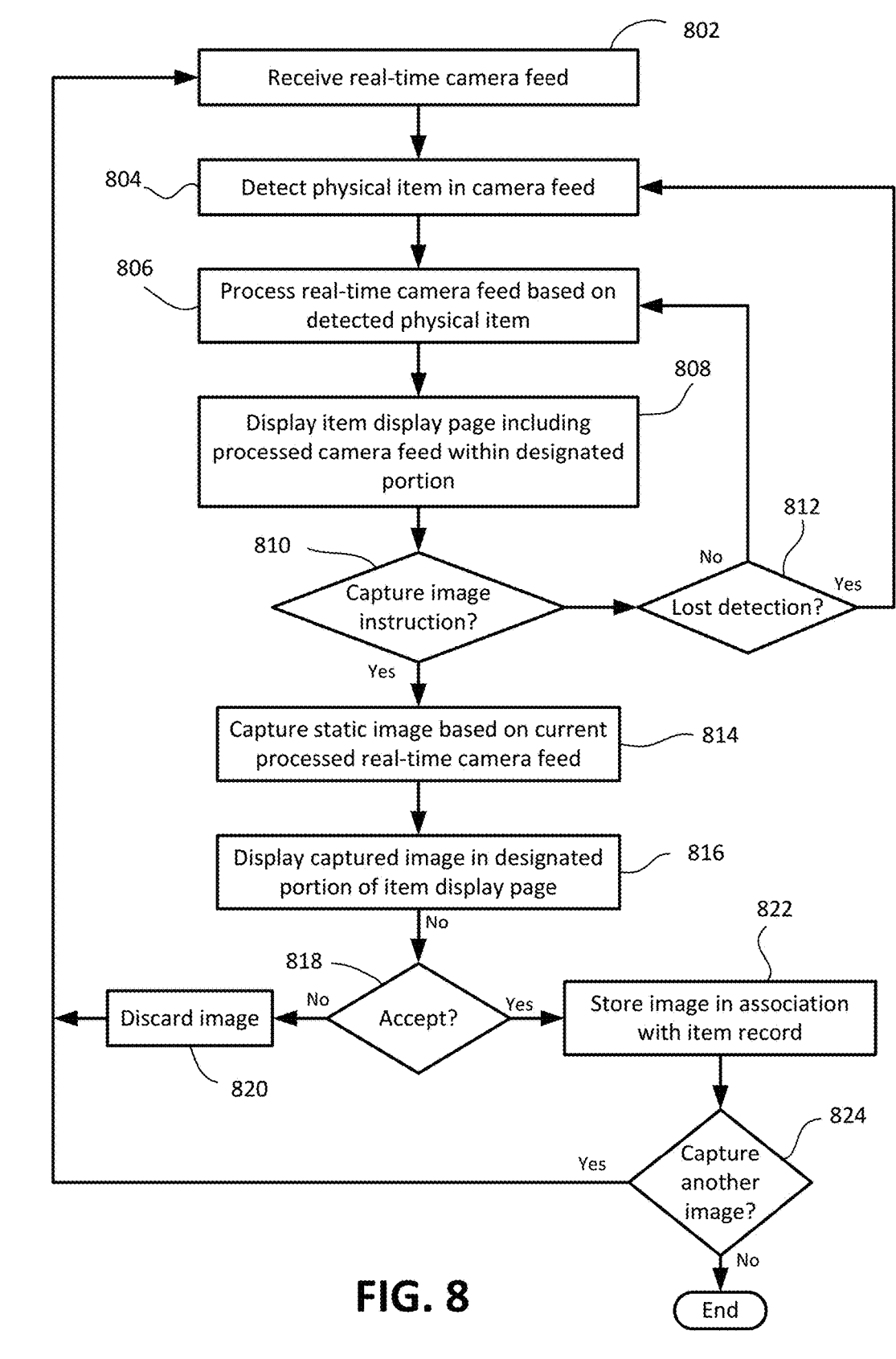
FIG. 8 shows, in flowchart form, an example method of capturing a product item image for use in an e-commerce context.

Reference is now made to FIG. 8, which shows a further example method 800 of capturing an image of a product item for use in building a database of product items for online retail. The method 800 may be implemented by a computing device having suitable computer-executable instructions for causing the computing device to carry out the described operations. The method 800 may be implemented, in whole or in part, by a mobile computing device, such as the client device 400 (FIG. 4). In some implementations, the client device 400 (FIG. 4) may off-load some operations of the method 800 to an external device, like the server 302 (FIG. 3).

The method 800 may be implemented within an inventory building application on the client device. The application may be operating in a product item entry mode, within which an operator may create or edit/amend a retail product item record. Part of that editing may include obtaining a suitable image or images of the product item for display to prospective consumers when browsing an e-commerce site and reviewing details regarding the product item.

The method 800 may include first detecting and/or receiving a user instruction (not shown) to enter the image capture mode. The user instruction may include a detecting an action, such as a menu selection or touch gesture. The detected touch gesture may include tapping an edit icon or tapping, swiping, or sustained pressure on an existing image or blank within the designated portion of a product item display page, for example.

The method 800 includes receiving the real-time live stream camera feed in operation 802. In operation 804, a physical product item is detected in the live stream camera feed. The detection of the product item may employ feature detection, and may, in some cases, be guided by a set of defined shapes or features that are associated with expected physical items. Examples may include boxes, cans, bottles, cartons, bags, or other such retail packaging. In the example case of a clothing retailer, the example physical items may be clothing shapes. The feature detection may include any suitable technique for identifying edges, blobs, corners, and may obtain feature descriptors or feature vectors relating to identified patches of interest in the image. The feature descriptors may be analyzed through attempting to match the feature descriptor with a library or database of features. The analysis may use scale-invariant feature transforms (SIFT) or other such image analysis techniques for mathematically describing local features and comparing them to entries in a database of features in order to try to recognize an object. Various computer vision techniques may be employed in implementing feature detection.

In some cases, operation 804 may further include extraction of data regarding the detected product item. The data extraction may include further feature detection aimed at, for example, logos or graphics in the area of interest. In some cases, text recognition algorithms, like optical character recognition (OCR), may be employed to extract text from the portion of the image containing the product item. In some cases, feature detection may be employed to identify an associated label, shelf tag, hang tag, or other identifying data regarding the physical item that is visible in the image but adjacent to the physical item. The computing device may interpret and categories extracted data. In part, the categorization may be based on where the data was extracted from relative to the physical item. For instance, text extracted from a shelf label may be correlated with text on the physical item to improve the accuracy of identifying an item brand or name. Text may be correlated to known brands or manufacturers to assist in identifying the category of item.

The real-time live stream of images from the camera are processed in operation 806 based, in part on the detected product item. The processing may include, for example, cropping the images to obtain a cropped live stream and/or scaling the images to obtain a scaled live stream. The cropping may be applied in accordance with an aspect ratio defined by the geometry of the designated portion of the item display page. The cropping and/or scaling may be applied so as to center the detected product item within the processed live stream and to ensure the detected product item spans at least a minimum portion of the vertical or horizontal dimension of the processed live stream.

The processing may include, for example, altering a portion of the image adjacent to the detected item, e.g. a background portion of the image. The altering of the background may include blurring the background or filling the background with a uniform colour value. The uniform colour value may match a background colour value set within the item display page in some implementations.

The processing may include, for example, altering image parameters within the images of the live stream. Image parameters may include, for instance, brightness, hue, saturation, white balance, or other such parameters. The alteration may be based on a determination that the image or images of the live stream have an image parameter that is higher than a maximum value or lower than a minimum value. The alteration may set the image parameter to the maximum value or the minimum value.

In operation 808, the product item display page is output to the display of the client device with the processed live stream inserted into the designated portion for a product image.

If a capture image instruction is received in operation 810, then the client device captures a static image based on the current processed live stream in operation 814. While awaiting a capture image instruction, the client device evaluates in operation 812 whether it has lost tracking of the product item in the live stream. If so, then it returns to operation 804 to try to re-detect the product item in the feed. If not, then it continues to process and display the live stream in operations 806 and 808.

The capture image instruction detected in operation 810 may include detection of a certain user input indicative of a capture instruction. The user input may be a button press, touchscreen gesture, voice command, or other such inputs. The captured image in operation 814 may be an image (e.g. frame) of the processed live stream. In another implementation, the captured image is a new image captured using the camera based on the user input command, which is then processed in the same manner as the processing of operation 806. In some implementations, the processing of the captured image includes the same processing operations used on the live stream in operation 806 and includes one or more additional processing operations.

The captured static image may then be displayed in the designated portion of the product item display page in place of the processed live stream, as indicated by operation 816. This affords the operator an opportunity to evaluate the suitability of the captured image. If in operation 818 the operator indicates acceptance, for example through input or selection of a "yes" or "ok" or "save" icon, then the image is stored in association with the item record, as indicated by operation 822. The storage may be local on the client device or may be remote on a remote server/database, or maybe both.

If the image is rejected in operation 818, then in operation 820 it may be discarded and the method 800 may return to operation 802 to re-start the image capture process by re-displaying a processed live stream from the camera within the product display page.

Once a satisfactory image is saved, the method 800 may permit capture of a further or additional image, as indicated by operation 824. The next image may be for replacing the saved image or may be additional to the saved image, such as in cases where the product display page provides the capability of displaying or navigating through more than one product item image.

It will be understood that some of the operations of the example method 800 may be performed in a different order or simultaneously without materially impacting operation of the method 800.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for capturing product images for online retail using a mobile device having a camera, the method comprising:

retrieving an item record for a product item from memory, the item record including data regarding the product item;

displaying-a product item display page for online retail of the product item in an online merchant store, the product item display page having a defined layout and graphical elements set by a theme selected for the online merchant store, including a designated portion defined for display of an image of the product item and one or more item detail areas displaying the data regarding the product item from the item record for the product item;

obtaining a real-time live stream of images from the camera showing the product item;

processing the live stream from the camera to create a processed live stream showing the product item;

displaying the processed live stream showing a real-time view of the product item displayed within the designated portion in the product item display page; and storing a processed image for the product item in association with the item record for the product item.

2. The computer-implemented method of claim 1, wherein processing further includes detecting the product item in the live stream.

3. The computer-implemented method of claim 2, wherein the processing of the live stream is based on the detected product item and includes cropping the live stream.

4. The computer-implemented method of claim 3, wherein the cropping is based on the geometry of the designated portion.

5. The computer-implemented method of claim 2, wherein the processing of the live stream is based on the detected product item and includes scaling the live stream.

6. The computer-implemented method of claim 5, wherein scaling is based on edges of the detected item and a minimum portion of a vertical dimension of the designated portion or of a horizontal dimension of the designated portion.

7. The computer-implemented method of claim 2, wherein processing includes altering a portion of images in the live stream adjacent to the detected product item.

8. The computer-implemented method of claim 7, wherein altering includes blurring or filling the portion of the images in the live stream adjacent to the detected product item.

9. The computer-implemented method of claim 1, wherein storing further includes detecting a capture image instruction and, in response to the capture image instruction, selecting a current frame of the processed live stream as the processed image.

10. The computer-implemented method of claim 1, wherein storing further includes detecting a capture image instruction and, in response to the capture image instruction, capturing a new static image using the camera, and processing the image to obtain the processed image.

11. The method claimed in claim 1, wherein the theme is a merchant-selected theme that specifies visual features applicable to all product item display pages used in the online merchant store.

12. A mobile computing device to capture product images for online retail, the device comprising:

one or more processors;

a display coupled to the one or more processors;

an image sensor to capture and provide one or more images to the one or more processors; and a processor-readable storage medium containing processor-executable instruction that, when executed by the one or more processors, are to cause the one or more processors to:

retrieve an item record for a product item from memory, the item record including data regarding the product item;

display a product item display page for online retail of the product item in an online merchant store, the product item display page having a defined layout and graphical elements set by a theme selected for the online merchant store, including a designated portion defined for display of an image of the product item and one or more item detail areas displaying the data regarding the product item from the item record for the product item;

obtain a real-time live stream of images from the image sensor showing the product item;

process a live stream from the image sensor to create a processed live stream showing the product item;

output, on the display, the processed live stream showing a real-time view of the product item displayed within the designated portion in the product item display page; and store a processed image for the product item in association with the item record for the product item.

13. The mobile computing device of claim 12, wherein the instructions are to further cause the one or more processors to process the live stream by detecting the product item in the live stream.

14. The mobile computing device of claim 13, wherein the instructions are to further cause the one or more processors to process the live stream by based on the detected product item and wherein processing includes cropping the live stream.

15. The mobile computing device of claim 14, wherein the cropping is based on the geometry of the designated portion.

16. The mobile computing device of claim 13, wherein the instructions are to further cause the one or more processors to process the live stream based on the detected product item and wherein processing includes scaling the live stream.

17. The mobile computing device of claim 16, wherein scaling is based on edges of the detected item and a minimum portion of a vertical dimension of the designated portion or of a horizontal dimension of the designated portion.

18. The mobile computing device of claim 13, wherein the instructions are to further cause the one or more processors to process the live stream by altering a portion of images in the live stream adjacent to the detected product item.

19. The mobile computing device of claim 18, wherein altering includes blurring or filling the portion of the images in the live stream adjacent to the detected product item.

20. The mobile computing device of claim 12, wherein the instructions are to further cause the one or more processors to store the processed image by detecting a capture image instruction and, in response to the capture image instruction, selecting a current frame of the processed live stream as the processed image.

21. The mobile computing device of claim 12, wherein the instructions are to further cause the one or more processors to store the processed image by detecting a capture image instruction and, in response to the capture image instruction, capturing a new static image using the image sensor, and processing the image to obtain the processed image.

22. A non-transitory computer-readable medium storing processor-executable instructions for capturing product images for online retail using a mobile device having a camera, wherein the instructions, when executed by one or more processors, are to cause the one or more processors to:

retrieve an item record for a product item from memory, the item record including data regarding the product item;

display a product item display page for online retail of the product item in an online merchant store, the product item display page having a defined layout and graphical elements set by a theme selected for the online merchant store, including a designated portion defined for display of an image of the product item and one or more item detail areas displaying the data regarding the product item from the item record for the product item;

obtain a real-time live stream of images from the camera sensor showing the product item;

process the live stream from the camera to create a processed live stream sensor showing the product item;

display the processed live stream showing a real-time view of the product item displayed within the designated portion in the product item display page; and store a processed image for the product item in association with the item record for the product item.

\* \* \* \* \*